(12) United States Patent
Tachiki

(10) Patent No.: US 12,458,050 B2
(45) Date of Patent: Nov. 4, 2025

(54) ORAL COMPOSITION AND METHOD FOR AMELIORATING HARSH TASTE

(71) Applicant: KOBAYASHI PHARMACEUTICAL CO., LTD., Osaka (JP)

(72) Inventor: Kensuke Tachiki, Ibaraki (JP)

(73) Assignee: KOBAYASHI PHARMACEUTICAL CO., LTD., Osaka (JP)

( * ) Notice: Subject to any disclaimer, the term of this patent is extended or adjusted under 35 U.S.C. 154(b) by 508 days.

(21) Appl. No.: 17/914,905

(22) PCT Filed: Mar. 19, 2021

(86) PCT No.: PCT/JP2021/011408
§ 371 (c)(1),
(2) Date: Sep. 27, 2022

(87) PCT Pub. No.: WO2021/200275
PCT Pub. Date: Oct. 7, 2021

(65) Prior Publication Data
US 2023/0135749 A1    May 4, 2023

(30) Foreign Application Priority Data

Apr. 2, 2020   (JP) ................................. 2020-066721

(51) Int. Cl.
| | | |
|---|---|---|
| *A61K 36/00* | (2006.01) | |
| *A23L 27/00* | (2016.01) | |
| *A23L 33/105* | (2016.01) | |
| *A61K 36/37* | (2006.01) | |
| *A61K 36/752* | (2006.01) | |

(52) U.S. Cl.
CPC .............. *A23L 33/105* (2016.08); *A23L 27/84* (2016.08); *A61K 36/37* (2013.01); *A61K 36/752* (2013.01)

(58) Field of Classification Search
None
See application file for complete search history.

(56) References Cited

U.S. PATENT DOCUMENTS

2020/0222831 A1    7/2020   Li et al.

FOREIGN PATENT DOCUMENTS

| | | |
|---|---|---|
| JP | 2009161522 A | 7/2009 |
| JP | 2009215275 A | 9/2009 |
| JP | 2009279013 A | 12/2009 |
| JP | 2011190248 A | 9/2011 |
| JP | 2011254782 A | 12/2011 |
| WO | 2016084887 A1 | 6/2016 |
| WO | 2019065396 A1 | 4/2019 |

OTHER PUBLICATIONS

Stohs et al. (2016) Phytother. Res. 30: 732-740. (Year: 2016).*
Chakravarty et al. (2020) Madras Agric. J. 107 (7-9): 287-292. (Year: 2020).*
International Search Report for International Application No. PCT/JP2021/011408 dated May 25, 2021, 6 pages including English Translation.
Nogata et al., "Flavonoid Composition of Fruit Tissues of Citrus Species", Bioscience, Biotechnology, and Biochemistry, 2006, vol. 70, No. 1, pp. 178-192.

* cited by examiner

*Primary Examiner* — Russell G Fiebig
(74) *Attorney, Agent, or Firm* — MH2 Technology Law Group, LLP

(57) ABSTRACT

An object of this invention is to suppress the harsh taste particular to an extract of a plant of the genus *Salacia*.
An oral composition comprises an extract of a plant of the genus *Salacia* and naringin, the naringin being present in an amount of 0.001 to 6 parts by weight per part by weight of the extract of a plant of the genus *Salacia*, on a dry weight basis. A method for ameliorating the harsh taste of an extract of a plant of the genus *Salacia* comprises combining 0.001 to 6 parts by weight of naringin with 1 part by weight of the extract of a plant of the genus *Salacia*, on a dry weight basis.

6 Claims, No Drawings

ORAL COMPOSITION AND METHOD FOR AMELIORATING HARSH TASTE

CROSS-REFERENCE TO RELATED APPLICATIONS

This application is a U.S. National Stage application of PCT/JP2021/011408 filed 19 Mar. 2021, which claims priority to Japanese Application No. 2020-066721 filed 2 Apr. 2020, the entire disclosures of which are hereby incorporated by reference in their entireties.

TECHNICAL FIELD

The present invention relates to an oral composition comprising an extract of a plant of the genus *Salacia* and a method for ameliorating a harsh taste.

BACKGROUND ART

Plants of the genus *Salacia* are climbers that grow naturally in, for example, subtropical regions, such as India, Sri Lanka, Thailand, and Brazil, and have been used for health maintenance in these regions for a long time. In recent years, it has been revealed that plants of the genus *Salacia* have an effect of increasing glucagon-like peptide 1 (GLP-1) production and are expected to have a slimming effect by suppressing appetite, and the like (Patent Literature 1). Plants of the genus *Salacia* are also known to slow the absorption of sugar in the body and to suppress the rise in postprandial blood glucose levels.

Extracts of plants of the genus *Salacia* have often been used for oral ingestion of plants of the genus *Salacia*. However, extracts of plants of the genus *Salacia* are known to have a particular unpleasant taste (harsh taste) that is a mixture of an astringent taste, a puckery taste, a rough sensation remaining on the tongue, and the like. Thus, extracts of plants of the genus *Salacia* are difficult to take; and when extracts of plants of the genus *Salacia* are combined with foods etc., the taste of the foods etc. is harmed.

CITATION LIST

Patent Literature

PTL 1: JP2011-190248A

SUMMARY OF INVENTION

Technical Problem

Thus, an object of the present invention is to suppress the unpleasant taste (harsh taste) particular to extracts of plants of the genus *Salacia*.

Solution to Problem

In view of the problems described above, the present inventor conducted extensive research and surprisingly found that by combining naringin, which has a bitter taste, with an extract of a plant of the genus *Salacia*, which has a particular harsh taste, at a specific ratio, the harsh taste particular to the extract of a plant of the genus *Salacia* can be suppressed. The inventor conducted further research based on this finding and accomplished the present invention. The present invention includes the following.

Item 1. An oral composition comprising:
an extract of a plant of the genus *Salacia*; and
naringin,
the naringin being present in an amount of 0.001 to 6 parts by weight per part by weight of the extract of a plant of the genus *Salacia*, on a dry weight basis.

Item 2. A method for ameliorating the harsh taste of an extract of a plant of the genus *Salacia*, comprising combining 0.001 to 6 parts by weight of naringin with 1 part by weight of the extract of a plant of the genus *Salacia*, on a dry weight basis.

Advantageous Effects of Invention

According to the present invention, the harsh taste particular to an extract of a plant of the genus *Salacia* can be suppressed by combining 0.001 to 6 parts by weight of naringin with 1 part by weight of the extract of a plant of the genus *Salacia*, on a dry weight basis. Thus, the present invention can provide an oral composition that contains an extract of a plant of the genus *Salacia*, but in which the harsh taste particular to the extract is suppressed. Moreover, the present invention can ameliorate the harsh taste particular to an extract of a plant of the genus *Salacia*.

In the present invention, the harsh taste particular to an extract of a plant of the genus *Salacia* refers to a particular unpleasant taste that is a mixture of an astringent taste, a puckery taste, a rough sensation remaining on the tongue, and the like; and that is different from the bitter taste sensed when eating grapefruit, which is derived from naringin.

DESCRIPTION OF EMBODIMENTS

The present invention provides an oral composition comprising an extract of a plant of the genus *Salacia* and naringin, the naringin being present in an amount of 0.001 to 6 parts by weight per part by weight of the extract of a plant of the genus *Salacia*, on a dry weight basis.

Extract of Plant of Genus *Salacia*

The plant of the genus *Salacia* that is a raw material for the extract of a plant of the genus *Salacia* (*Salacia* plant extract) in the present invention may be any known plant of the genus *Salacia*. Examples of plants of the genus *Salacia* include, but are not limited to, *Salacia chinensis*, *Salacia reticulata*, *Salacia prinoides*, *Salacia oblonga*, *Salacia latifolia*, *Salacia brunoniana*, *Salacia grandiflora*, *Salacia macrosperma*, and the like. The plant part used is not limited as long as it is a part of a plant of the genus *Salacia*. Examples include roots, trunks, branches, stems, leaves, flowers, fruits, bark, and the like; and preferable examples include roots, trunks, branches, stems, and the like. The plants and parts used may be used singly or in a combination of two or more.

The production method (extraction method), extraction conditions, etc. for the extract are not particularly limited, and the extract may be produced according to a conventionally known method. For example, a plant part of the genus *Salacia* mentioned above can be subjected as is to extraction by squeezing or solvent extraction; or dried, pulverized, cut, etc. as necessary and then subjected to extraction by squeezing or solvent extraction, thereby obtaining an extract. For solvent extraction, any method known in this field, such as water (including warm water and hot water) extraction, alcohol extraction, or supercritical extraction, can be used.

When solvent extraction is performed, examples of solvents include water; alcohols (either anhydrous or hydrous), such as lower alcohols (e.g., methanol, ethanol, and isopropanol) and polyhydric alcohols (e.g., propylene glycol, 1,3-butylene glycol, and glycerin); ketones, such as acetone;

diethyl ether; dioxane; acetonitrile; esters, such as ethyl acetate; xylene; benzene; chloroform; and the like. Preferred examples of solvents include water, lower alcohols, 1,3-butylene glycol, and the like. More preferred examples include water. The solvent temperature during extraction is not limited, and is, for example, preferably 60 to 100° C., and more preferably 75 to 100° C. These solvents may be used singly or in a combination of two or more.

In the present invention, an extract obtained by solvent extraction as described above can be referred to as a "solvent extract." Furthermore, although not limiting the present invention, for example, when water is used as a solvent, the resulting extract can be referred to as a "water extract"; and when a lower alcohol is used as a solvent, the resulting extract can be referred to as a "lower alcohol extract."

The resulting extract may be used as is; or dried and used in a solid form, such as a powder or granules. If necessary, the resulting extract may be subjected to purification, a concentration treatment, a separation treatment of a highly active fraction, or the like. Examples of purification treatments include, but are not limited to, treatments, such as filtration and adsorption or decoloration using an ion-exchange resin, activated carbon column, or the like. As the concentration treatment, a conventional method using, for example, an evaporator can be used. As the separation treatment of a highly active fraction, a known separation treatment, such as gel filtration, an adsorption treatment, silica gel column chromatography, or high-performance liquid chromatography (HPLC), can be used.

Moreover, for example, the extract obtained as described above (or a dried product, purified product, concentrated product, highly active fraction, or the like of the extract) may be made into a powder form according to a known method, such as powderization by freeze-drying or powderization by spray drying, and may be used as the extract used in the present invention.

Preferred examples of the extract of a plant of the genus *Salacia* include, but are not limited to, extracts obtained by drying, pulverizing, and/or cutting a plant part used as a raw material, performing extraction with a solvent, and performing filtration; and extracts obtained by further concentrating and/or drying the extracts thus obtained.

As a preferred example, the extract of a plant of the genus *Salacia* can be obtained by immersing 1 kg of a plant of the genus *Salacia*, more preferably 1 kg of a dried, pulverized, and/or cut plant of the genus *Salacia*, in 1 to 50 kg of a solvent; performing extraction at any temperature (e.g. preferably 60 to 100° C.) for any period of time (e.g. 30 minutes to 24 hours) optionally with stirring; performing filtration as necessary; and performing concentration and/or drying as necessary.

The extract of a plant of the genus *Salacia* used in the present invention may be a commercial product, or a commercial product that has been appropriately subjected to a treatment such as drying.

The extracts may be used singly or in a combination of two or more.

Naringin

Naringin is a compound represented by the molecular formula $C_{27}H_{32}O_{14}$. Naringin is a compound that causes the bitter taste sensed when eating grapefruit.

The oral composition of the present invention is not limited as long as it contains an extract of a plant of the genus *Salacia* and naringin, and the amount of naringin in the oral composition is 0.001 to 6 parts by weight per part by weight of the extract of a plant of the genus *Salacia*, on a dry weight basis. In the oral composition, the amount of naringin is, for example, preferably 0.003 to 5 parts by weight, more preferably 0.005 to 4 parts by weight, even more preferably 0.008 to 3 parts by weight, and particularly preferably 0.01 to 1 part by weight, per part by weight of the extract of a plant of the genus *Salacia*, on a dry weight basis. A dried product of the extract of a plant of the genus *Salacia* can be obtained by subjecting the extract to a drying treatment. The drying treatment can be performed by concentrating the extract under reduced pressure using a general evaporator and performing spray drying, freeze-drying, vacuum drying, or the like. A more detailed treatment procedure follows the procedure in the Examples described later.

The content of the extract of a plant of the genus *Salacia* in the oral composition is, for example, preferably 1 to 99 wt %, and more preferably 10 to 50 wt %, on a dry weight basis. However, the content of the extract in the oral composition is not limited thereto.

In the oral composition, the amount of the extract of a plant of the genus *Salacia* to be ingested (administered) is not particularly limited, and may be appropriately set according to the size, age, and symptom of a subject (target animal), the application form, the purpose of use, the degree of expected effect derived from the extract of a plant of the genus *Salacia*, etc. Although not limiting the present invention, the daily intake (dose) is, for example, such that the total amount of the extract of a plant of the genus *Salacia* is preferably 50 to 3000 mg, more preferably 100 to 2000 mg, and even more preferably 200 to 1000 mg, on a dry weight basis, for an adult with a body weight of 60 kg. The oral composition may be ingested (administered) in a single intake (dose) or multiple intakes (doses) per day.

The form of the oral composition of the present invention is not limited as long as it can be taken orally, and may be appropriately set according to the purpose. Examples of the form of the oral composition of the present invention include various forms, such as liquid forms (e.g., fluids, emulsions, suspensions, syrups, extracts, spirits, and elixirs) and semi-solid or solid forms (e.g., powders, granules, fine granules, tablets, pills, capsules (including hard and soft capsules), troches, chewable tablets, gels, creams, pastes, mousses, sheets, and freeze-dried products of the above-stated liquid forms).

The oral composition of the present invention may also be in a sustained-release dosage form. Moreover, for example, the tablets may be coated with known coating materials to prepare, for example, sugar-coated tablets, gelatin-coated tablets, enteric-coated tablets, film-coated tablets, double-layer tablets, and multilayer tablets, if necessary.

The oral composition of the present invention may be ingested (administered) as is, or mixed with water etc. and ingested (administered).

The use of the oral composition of the present invention is not limited, and may be appropriately set according to the purpose. The oral composition of the present invention can be used as, for example, a food composition (including drinks, foods with health claims (such as food for specified health uses, food with nutrient function claims, foods with function claims, and supplements), and foods for the sick), a pharmaceutical composition, a quasi-drug composition, or a feed composition (including pet foods and the like); and can also be used as, for example, an additive for food compositions, pharmaceutical compositions, quasi-drug compositions, feed compositions, etc. The oral composition of the present invention may thus be used simultaneously with food compositions etc.

The oral composition of the present invention may be produced according to conventionally known and usual procedures in the above-mentioned various forms, uses, etc. The oral composition of the present invention may be produced by, for example, mixing an extract of a plant of the genus *Salacia*, naringin, and, if necessary, one or more optional components, such as pharmaceutically acceptable components and edible components. Examples of the optional components include excipients, disintegrators, lubricants, solvents (e.g., water and alcohols (either anhydrous of hydrous), including lower alcohols, such as methanol, ethanol, and isopropanol, and polyhydric alcohols, such as propylene glycol and 1,3-butylene glycol), flavors, coloring agents, suspending agents, emulsifiers, binders, preservatives, thickeners, absorption enhancers, amino acids, vitamins, various nutritional components, and the like. These optional components may be used singly or in a combination of two or more, and the content thereof may be appropriately determined.

In the present invention, the subject (target animal) to which the oral composition is applied is also not limited, and examples include humans, mammals other than humans, and the like. Examples of mammals other than humans include animals, such as mice, rats, guinea pigs, rabbits, dogs, cats, monkeys, pigs, cows, and horses.

According to the oral composition of the present invention, the harsh taste particular to an extract of a plant of the genus *Salacia* can be suppressed by combining 0.001 to 6 parts by weight of naringin with 1 part by weight of the extract of a plant of the genus *Salacia*, on a dry weight basis, as described above. Therefore, the present invention can provide an oral composition that contains an extract of a plant of the genus *Salacia*, but is easy to take since the harsh taste particular to the extract is suppressed. Accordingly, according to the present invention, the distress associated with taking an extract of a plant of the genus *Salacia* over time can also be suppressed, and dosing compliance can be increased.

Thus, it can be said that the present invention provides a method for producing a *Salacia* plant extract-containing oral composition, the method comprising combining 0.001 to 6 parts by weight of naringin with 1 part by weight of an extract of a plant of the genus *Salacia*, on a dry weight basis. It can also be said that the present invention provides a method for ameliorating the harsh taste of an extract of a plant of the genus *Salacia*, the method comprising combining 0.001 to 6 parts by weight of naringin with 1 part by weight of the extract of a plant of the genus *Salacia*, on a dry weight basis.

In these methods, the extract of a plant of the genus *Salacia*, naringin, their proportions, oral composition, optional components, harsh taste, and the like are as described above.

EXAMPLES

The present invention is described in more detail below with reference to Examples; however, the invention is not limited to these Examples.

1. Extract of Plant of Genus *Salacia*

The trunk and root of *Salacia chinensis* were pulverized into roughly 7-mm square pieces. 1 kg of the pieces thus obtained was added to 20 kg of water at 98° C., and the resulting mixture was subjected to extraction with stirring for 2 hours while the mixture was maintained at 98° C. The resulting liquid was concentrated under reduced pressure using a rotary evaporator (concentration temperature: 45° C.; Brix=30), and the concentrated liquid was freeze-dried to give a powdered extract of the plant of the genus *Salacia* (dried product).

2. Naringin

As naringin, a commercial product (trade name: Naringin; produced by Ogawa & Co., Ltd. (purified product)) was used.

3. Preparation of Oral Composition

The extract of the plant of the genus *Salacia* and the naringin were placed in bags in the weight ratios shown in Table 1 below, mixed well, removed from the bags, and sieved through a 100-mesh sieve. The sieved mixtures were placed in bags again, mixed and sieved (100 mesh) again, and the resulting powder mixtures were used as test samples (Examples 1 to 10 and Comparative Examples 1 to 4).

4. Evaluation Method

Five expert panelists were asked to directly place 100 mg of each of the test samples prepared as described above on their tongues, orally ingest it, and score each of the harsh taste and the bitter taste according to the following scale of 0 to 4:

4: hardly sensed
3: slightly sensed
2: sensed
1: strongly sensed
0: very strongly sensed The average values of the total scores of all of the panelists were then rounded off and evaluated based on a 4-point scale according to the following criteria:

A: 3 or higher
B: 2 or higher and lower than 3
C: 1 or higher and lower than 2
D: lower than 1

In the harsh taste evaluation of the above evaluation method, the case in which the harsh taste was sensed to an extent similar to that when 100 mg of the extract of the plant of the genus *Salacia* was orally ingested as is was evaluated as "0: very strongly sensed," the case in which the harsh taste was acceptable as an oral composition (food) was evaluated as "2: sensed," and the case in which the harsh taste was not noticed unless the panelist paid attention to it was evaluated as "4: hardly sensed."

Similarly, in the bitter taste evaluation, the case in the bitter taste was sensed to an extent similar to that when 100 mg of the naringin was orally ingested as is was evaluated as "0: very strongly sensed," the case in which the bitter taste was acceptable as an oral composition (food) was evaluated as "2: sensed," and the case in which the bitter taste was not noticed unless the panelist paid attention to it was evaluated as "4: hardly sensed."

5. Results

Table 1 shows the results.

TABLE 1

|  | Comparative Example 1 | Comparative Example 2 | Comparative Example 3 | Example 1 | Example 2 | Example 3 | Example 4 |
| --- | --- | --- | --- | --- | --- | --- | --- |
| Extract of plant of genus *Salacia* | 1 | — | 1 | 1 | 1 | 1 | 1 |

TABLE 1-continued

| Naringin | — | 1 | 0.0001 | 0.001 | 0.005 | 0.01 | 0.1 |
|---|---|---|---|---|---|---|---|
| Harsh taste | D | A | D | C | B | A | A |
| Bitter taste | A | D | A | A | A | A | A |

| | Example 5 | Example 6 | Example 7 | Example 8 | Example 9 | Example 10 | Comparative Example 4 |
|---|---|---|---|---|---|---|---|
| Extract of plant of genus Salacia | 1 | 1 | 1 | 1 | 1 | 1 | 1 |
| Naringin | 0.5 | 1 | 1.5 | 2 | 4 | 6 | 10 |
| Harsh taste | A | A | A | A | A | A | A |
| Bitter taste | A | A | B | B | B | C | D |

As shown in Table 1, in Comparative Example 1, which contains only the extract of the plant of the genus *Salacia*, the harsh taste particular to the extract of the plant of the genus *Salacia* was sensed very strongly. Naringin is known to be a bitter taste component of grapefruit, and in Comparative Example 2, which contains only the naringin, the bitter taste particular to the naringin was sensed very strongly. Further, in Comparative Example 3 as well, in which 0.0001 parts by weight of the naringin was combined with 1 part by weight of the extract of the plant of the genus *Salacia*, the harsh taste was sensed strongly.

In contrast, in Examples 1 to 10, in which 0.001 to 6 parts by weight of the naringin is combined with 1 part by weight of the extract of the plant of the genus *Salacia*, the combination of the naringin, which is a bitter taste component, with the extract of the plant of the genus *Salacia*, which has a harsh taste, surprisingly reduced the harsh taste particular to the extract of the plant of the genus *Salacia*; and at the same time, reduced the bitter taste particular to the naringin. However, in Comparative Example 4, in which 10 parts by weight of the naringin is combined with 1 part by weight of the extract of the plant of the genus *Salacia*, the bitter taste was strongly sensed, although the harsh taste was greatly reduced.

The results showed that a composition that is easy to take since the harsh taste particular to an extract of a plant of the genus *Salacia* is significantly suppressed can be obtained by combining 0.001 to 6 parts by weight of naringin with 1 part by weight of the extract of the plant of the genus *Salacia*.

In the above test, the hot water extract was used as an extract of a plant of the genus *Salacia*; however, the same effects can also be obtained when, for example, a hydrous ethanol extract or an ethanol extract is used. In addition, in the above test, *Salacia chinensis* was used as a plant of the genus *Salacia*; however, the same effects can also be obtained when other plants of the genus *Salacia*, such as *Salacia oblonga*, *Salacia reticulata*, and *Salacia prinoides*, are used.

The invention claimed is:

1. An oral composition comprising:
   an extract of a plant of the genus *Salacia*; and
   naringin in an amount of 0.001 to 6 parts by weight per part by weight of the extract of the plant of the genus *Salacia*, on a dry weight basis.

2. The oral composition of claim 1, wherein the plant of the genus *Salacia* is *Salacia chinensis*, *Salacia reticulata*, *Salacia prinoides*, *Salacia oblonga*, *Salacia latifolia*, *Salacia brunoniana*, *Salacia grandiflora*, or *Salacia macrosperma*.

3. The oral composition of claim 1, wherein the extract of the plant of the genus *Salacia* is obtained from roots, trunks, branches, stems, leaves, flowers, fruits, bark, and or any combination thereof.

4. A method for ameliorating the harsh taste of an extract of a plant of the genus *Salacia*, comprising combining 0.001 to 6 parts by weight of naringin with 1 part by weight of the extract of the plant of the genus *Salacia*, on a dry weight basis.

5. The method of claim 4, wherein the plant of the genus *Salacia* is *Salacia chinensis*, *Salacia reticulata*, *Salacia prinoides*, *Salacia oblonga*, *Salacia latifolia*, *Salacia brunoniana*, *Salacia grandiflora*, or *Salacia macrosperma*.

6. The method of claim 4, wherein the extract of the plant of the genus *Salacia* is obtained from roots, trunks, branches, stems, leaves, flowers, fruits, bark, and or any combination thereof.

* * * * *